United States Patent
Ayazi et al.

(10) Patent No.: US 10,025,120 B2
(45) Date of Patent: Jul. 17, 2018

(54) METHOD AND SYSTEM FOR A LOW PARASITIC SILICON HIGH-SPEED PHASE MODULATOR HAVING RAISED FINGERS PERPENDICULAR TO THE PN JUNCTION

(71) Applicant: Luxtera Inc., Carlsbad, CA (US)

(72) Inventors: Ali Ayazi, Carlsbad, CA (US); Gianlorenzo Masini, Carlsbad, CA (US); Subal Sahni, La Jolla, CA (US); Attila Mekis, Carlsbad, CA (US); Thierry Pinguet, Arlington, WA (US)

(73) Assignee: Luxtera, Inc., Carlsbad, CA (US)

( * ) Notice: Subject to any disclaimer, the term of this patent is extended or adjusted under 35 U.S.C. 154(b) by 157 days.

(21) Appl. No.: 14/105,527

(22) Filed: Dec. 13, 2013

(65) Prior Publication Data
US 2015/0316793 A1 Nov. 5, 2015

Related U.S. Application Data

(60) Provisional application No. 61/797,697, filed on Dec. 13, 2012.

(51) Int. Cl.
*G02F 1/025* (2006.01)
*G02F 1/225* (2006.01)
*G02F 1/21* (2006.01)

(52) U.S. Cl.
CPC ............ *G02F 1/025* (2013.01); *G02F 1/2257* (2013.01); *G02F 2001/212* (2013.01); *G02F 2201/06* (2013.01); *G02F 2202/105* (2013.01)

(58) Field of Classification Search
None
See application file for complete search history.

(56) References Cited

U.S. PATENT DOCUMENTS

| | | | | |
|---|---|---|---|---|
| 5,349,599 A * | 9/1994 | Larkins | ................... | G02F 3/026 257/E33.047 |
| 6,298,177 B1 * | 10/2001 | House | ..................... | G02F 1/025 385/3 |
| 6,374,001 B1 * | 4/2002 | Bozeat | ..................... | G02F 1/025 385/131 |
| 6,645,854 B1 * | 11/2003 | Hopper | ................. | H01L 21/761 257/E21.544 |

(Continued)

*Primary Examiner* — Andrew Jordan
(74) *Attorney, Agent, or Firm* — McAndrews, Held & Malloy

(57) ABSTRACT

Methods and systems for a low-parasitic silicon high-speed phase modulator are disclosed and may include fabricating an optical phase modulator that comprises a PN junction waveguide formed in a silicon layer, wherein the silicon layer may be on an oxide layer and the oxide layer may be on a silicon substrate. The PN junction waveguide may have p-doped and n-doped regions on opposite sides along a length of the PN junction waveguide, and portions of the p-doped and n-doped regions may be removed. Contacts may be formed on remaining portions of the p-doped and n-doped regions. Portions of the p-doped and n-doped regions may be removed symmetrically about the PN junction waveguide. Portions of the p-doped and n-doped regions may be removed in a staggered fashion along the length of the PN junction waveguide. Etch transition features may be removed along the p-doped and n-doped regions.

20 Claims, 8 Drawing Sheets

(56) References Cited

U.S. PATENT DOCUMENTS

| | | | | |
|---|---|---|---|---|
| 6,801,702 | B2* | 10/2004 | Day | G02F 1/025 385/129 |
| 6,845,198 | B2* | 1/2005 | Montgomery | G02F 1/2257 359/245 |
| 7,116,853 | B2* | 10/2006 | Gunn, III | G02F 1/025 257/499 |
| 7,167,605 | B2* | 1/2007 | Chang | B82Y 20/00 385/2 |
| 7,251,408 | B1* | 7/2007 | Gunn, III | G02F 1/025 385/132 |
| 7,542,630 | B2* | 6/2009 | Zheng | G02B 6/132 385/2 |
| 7,747,122 | B2* | 6/2010 | Shetrit | G02B 6/12004 359/279 |
| 8,149,493 | B2* | 4/2012 | Chen | G02F 1/025 359/250 |
| 8,252,670 | B2* | 8/2012 | Fedeli | G02B 6/1347 257/E21.334 |
| 8,520,985 | B2* | 8/2013 | Park | G02F 1/025 385/3 |
| 8,532,440 | B2* | 9/2013 | Ushida | G02F 1/025 385/131 |
| 8,542,954 | B2* | 9/2013 | Kung | G02B 6/134 385/129 |
| 8,643,929 | B2* | 2/2014 | Gill | G02F 1/21 359/237 |
| 8,693,811 | B2* | 4/2014 | Morini | G02F 1/025 257/E21.499 |
| 8,923,664 | B2* | 12/2014 | Mekis | G02B 6/43 385/12 |
| 8,989,522 | B2* | 3/2015 | Qian | H01L 31/105 385/14 |
| 9,104,047 | B2* | 8/2015 | Manouvrier | G02F 1/025 |
| 9,110,314 | B2* | 8/2015 | Tu | G02F 1/025 |
| 2002/0126976 | A1* | 9/2002 | Day | G02F 1/025 385/130 |
| 2004/0208454 | A1* | 10/2004 | Montgomery | G02F 1/2257 385/50 |
| 2005/0214989 | A1* | 9/2005 | Keyser | G02B 6/136 438/155 |
| 2008/0212913 | A1* | 9/2008 | Gill | G02F 1/025 385/2 |
| 2010/0059822 | A1* | 3/2010 | Pinguet | H01L 27/1203 257/351 |
| 2010/0060970 | A1* | 3/2010 | Chen | G02F 1/025 359/245 |
| 2010/0080504 | A1* | 4/2010 | Shetrit | G02B 6/12004 385/14 |
| 2011/0042553 | A1* | 2/2011 | Masini | H01L 31/1105 250/214 A |
| 2011/0170161 | A1* | 7/2011 | Gill | G02F 1/21 359/259 |
| 2011/0180795 | A1* | 7/2011 | Lo | G02F 1/025 257/51 |
| 2011/0211786 | A1* | 9/2011 | Ushida | G02F 1/025 385/2 |
| 2011/0305416 | A1* | 12/2011 | Mekis | G02B 6/43 385/28 |
| 2012/0189239 | A1* | 7/2012 | Tu | G02F 1/025 385/2 |
| 2012/0201488 | A1* | 8/2012 | Liow | G02F 1/025 385/3 |
| 2013/0301975 | A1* | 11/2013 | Spann | G02F 1/025 385/3 |
| 2014/0127842 | A1* | 5/2014 | Song | G02F 1/025 438/31 |
| 2014/0241658 | A1* | 8/2014 | Chen | G02F 1/2257 385/3 |
| 2014/0248019 | A1* | 9/2014 | Witzens | G02F 1/0121 385/2 |
| 2014/0286647 | A1* | 9/2014 | Ayazi | G02F 1/2257 398/139 |
| 2015/0316793 | A1* | 11/2015 | Ayazi | G02F 1/025 385/3 |

* cited by examiner

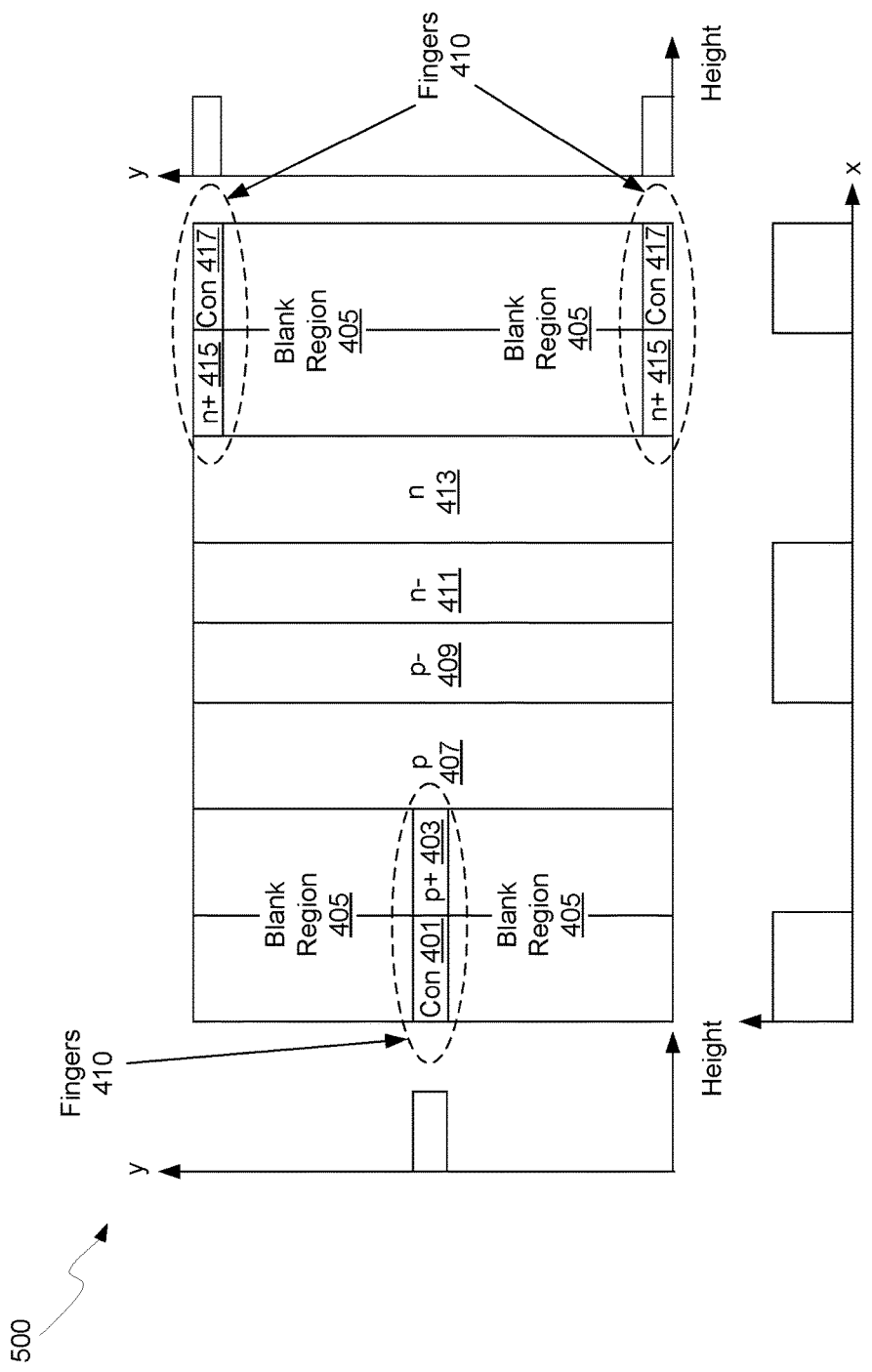

METHOD AND SYSTEM FOR A LOW PARASITIC SILICON HIGH-SPEED PHASE MODULATOR HAVING RAISED FINGERS PERPENDICULAR TO THE PN JUNCTION

CROSS-REFERENCE TO RELATED APPLICATIONS/INCORPORATION BY REFERENCE

This application claims priority to U.S. Provisional Application 61/797,697, filed on Dec. 13, 2012, which is hereby incorporated herein by reference in its entirety.

FIELD

Certain embodiments of the invention relate to semiconductor processing. More specifically, certain embodiments of the invention relate to a method and system for a low-parasitic silicon high-speed phase modulator.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for a low-parasitic silicon high-speed phase modulator, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5 is a drawing illustrating an optical phase modulator with staggered reduced doped area, in accordance with an example embodiment of the disclosure.

DETAILED DESCRIPTION OF THE INVENTION

Certain aspects of the invention may be found in a method and system for a low-parasitic silicon high-speed phase modulator. Exemplary aspects of the invention may comprise fabricating an optical phase modulator that comprises a PN junction waveguide formed in a silicon layer wherein the silicon layer may be on an oxide layer and the oxide layer may be on a silicon substrate. The PN junction waveguide may have p-doped and n-doped regions on opposite sides along a length of the PN junction waveguide, and portions of the p-doped and n-doped regions may be removed. Contacts may be formed on remaining portions of the p-doped and n-doped regions. Portions of the p-doped and n-doped regions may be removed symmetrically about the PN junction waveguide. Portions of the p-doped and n-doped regions may be removed in a staggered fashion along the length of the PN junction waveguide. Etch transition features may be removed along the p-doped and n-doped regions, wherein the etch transition features provide a transition between deep etched and shallow etched features in the optical phase modulator. The silicon layer, oxide layer, and silicon substrate may comprise a silicon-on-insulator (SOI) complementary metal-oxide semiconductor (CMOS) wafer. A parasitic capacitance of the optical phase modulator may be reduced by the removing of portions of the p-doped and n-doped regions. The optical phase modulator may be integrated in an optical transceiver formed on the silicon substrate. The remaining portions of the p-doped and n-doped regions may comprise fingers for forming contacts that are staggered on opposite sides along the length of the PN junction waveguide. Portions of the p-doped and n-doped regions may be removed down to the oxide layer on the silicon substrate. The optical phase modulator may be integrated in a Mach-Zehnder interferometer modulator.

Figure 1A:
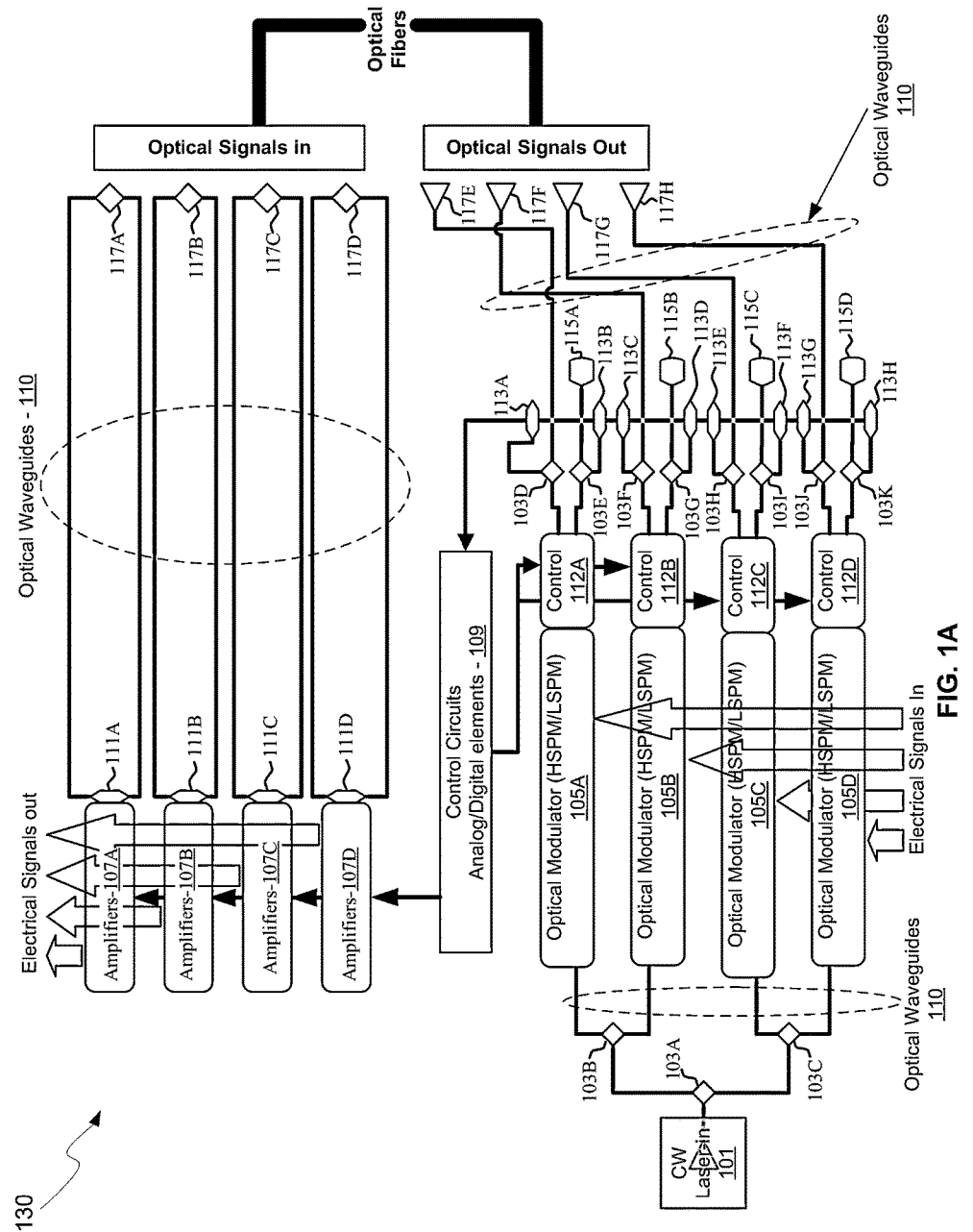
FIG. 1A is a block diagram of a photonically enabled CMOS chip comprising low-parasitic silicon high-speed phase modulators, in accordance with an exemplary embodiment of the invention.

FIG. 1A is a block diagram of a photonically enabled CMOS chip comprising low-parasitic silicon high-speed phase modulators, in accordance with an exemplary embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising directional couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode or multi-mode waveguides may be used in photonic integrated circuits.

Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The optical intensity modulator is a main building block of silicon photonic circuits. In general, both phase and intensity modulators may be used to modulate light. A conventional phase modulator on a silicon platform is a p-n junction embedded in a waveguide, and may be used in a Mach-Zehnder interferometer configuration comprising two arms receiving similar optical intensity after a power splitter. Each arm comprises a phase modulator, so that intensity modulation may be achieved by interfering the outputs of the two arms using a power combiner.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junction phase modulators (PINPM) where current injection into the PIN junction modifies the carrier density, and thus the index of refraction of the semiconductor material. An example of an HSPM is a reversed biased PIN or PN junction, where the index of refraction is also modulated via the carrier density, but which allows much faster operation, albeit at a lower phase modulation efficiency per waveguide length.

High-speed modulators in SOI CMOS wafers may suffer from parasitic capacitance from the area of the modulator over the semiconductor substrate. Etch transition features are utilized as boundaries between deep and shallow trenches in the modulator structure, where the deep etch is utilized to isolate the modulator by etching down to the oxide layer in the SOI wafer, and the shallow trench is utilized to form the waveguide structure in the modulator. While the etch transition features are not part of the operational structure of the modulator, they are utilized to form the modulator, and can affect the performance with parasitic capacitance to the substrate. Additionally, the higher doped regions of the PN structure add capacitance to the structure. In an example scenario, the etch transition regions may be reduced or eliminated and/or the higher doped regions that provide contact to the PN diode may be reduced in area with alternating blank regions. This is shown further with respect to FIGS. 2-5.

The outputs of the modulators 105A-105D may be optically coupled via the waveguides 110 to the grating couplers 117E-117H. The directional couplers 103A-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an example embodiment, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the CMOS chip 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the CMOS chip 130.

Integrated photonics platforms allow the full functionality of an optical transceiver to be integrated on a single chip, the CMOS chip 130, for example. A transceiver chip comprises optoelectronic circuits that create and process the optical/electrical signals on the transmitter (Tx) and the receiver (Rx) sides, as well as optical interfaces that couple the optical signal to and from one or more fibers. The signal processing functionality may comprise modulating the optical carrier, detecting the optical signal, splitting or combining data streams, and multiplexing or demultiplexing data on carriers with different wavelengths. In another example scenario, a plurality of chips may be utilized, with an optical interposer for receiving electronics chips and photonics chips, in instances where the electronics chips and photonics chips are manufactured in different CMOS nodes.

The light source may be external to the chip or may be integrated with the chip in a hybrid scheme. It is often advantageous to have an external continuous-wave (CW) light source, because this architecture allows heat sinking and temperature control of the source separately from the transceiver chip 130. An external light source may also be connected to the transceiver chip 130 via a fiber interface.

An integrated transceiver may comprise at least three optical interfaces, including a transmitter input port to interface to the CW light source, labeled as CW Laser In 101; a transmitter output port to interface to the fiber carrying the optical signal, labeled Optical Signals Out; and a receiver input port to interface to the fiber carrying the optical signal, labeled Optical Signals In.

Figure 1B:
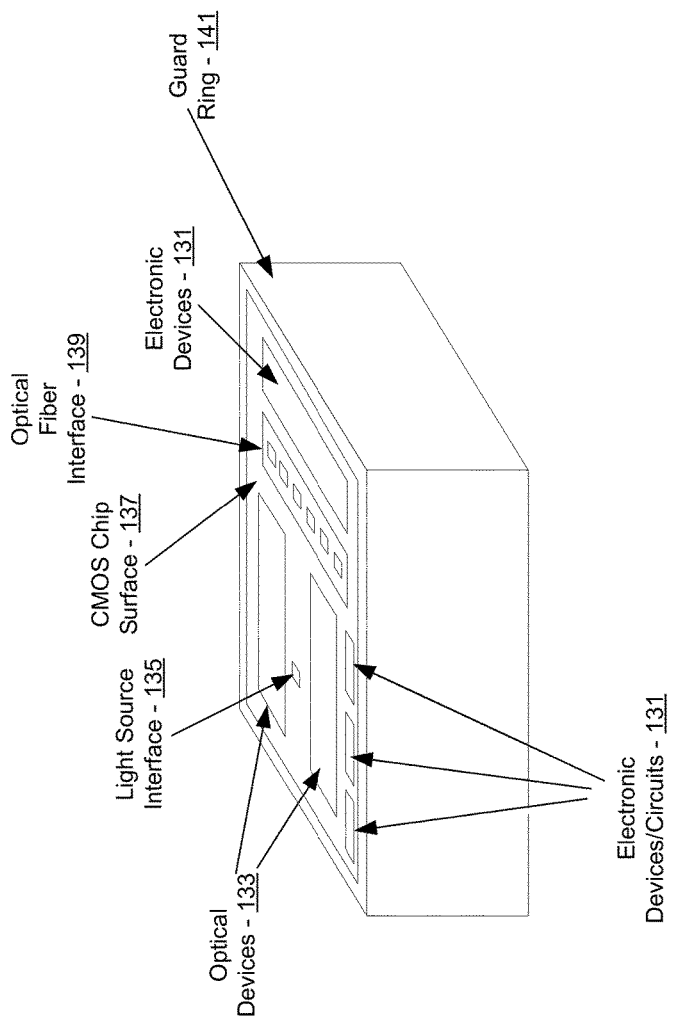
FIG. 1B is a diagram illustrating a CMOS chip, in accordance with an example embodiment of the disclosure.

FIG. 1B is a diagram illustrating an exemplary CMOS chip, in accordance with an exemplary embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the directional couplers 103A-103K, optical terminations 115A-115D, grating couplers 117A-117H, optical modulators 105A-105D, high-speed heterojunction photodiodes 111A-111D, and monitor photodiodes 113A-113H.

High-speed modulators in SOI CMOS wafers may suffer from parasitic capacitance from the area of the modulator over the conductive substrate. Etch transition features are utilized as boundaries between deep and shallow trenches in the modulator structure, where the deep etch is utilized to isolate the modulator by etching down to the oxide layer in the SOI wafer, and the shallow trench is utilized to form the waveguide structure in the modulator. While the etch transition features are not part of the operational structure of the modulator, they are utilized to form the modulator, and can affect the performance with parasitic capacitance to the substrate. Additionally, the higher doped regions of the PN structure add capacitance to the structure. In an example scenario, the etch transition regions may be reduced or eliminated and/or the higher doped regions that provide contact to the PN diode may be reduced in area with alternating blank regions. This is shown further with respect to FIGS. 2-5.

Figure 1C:
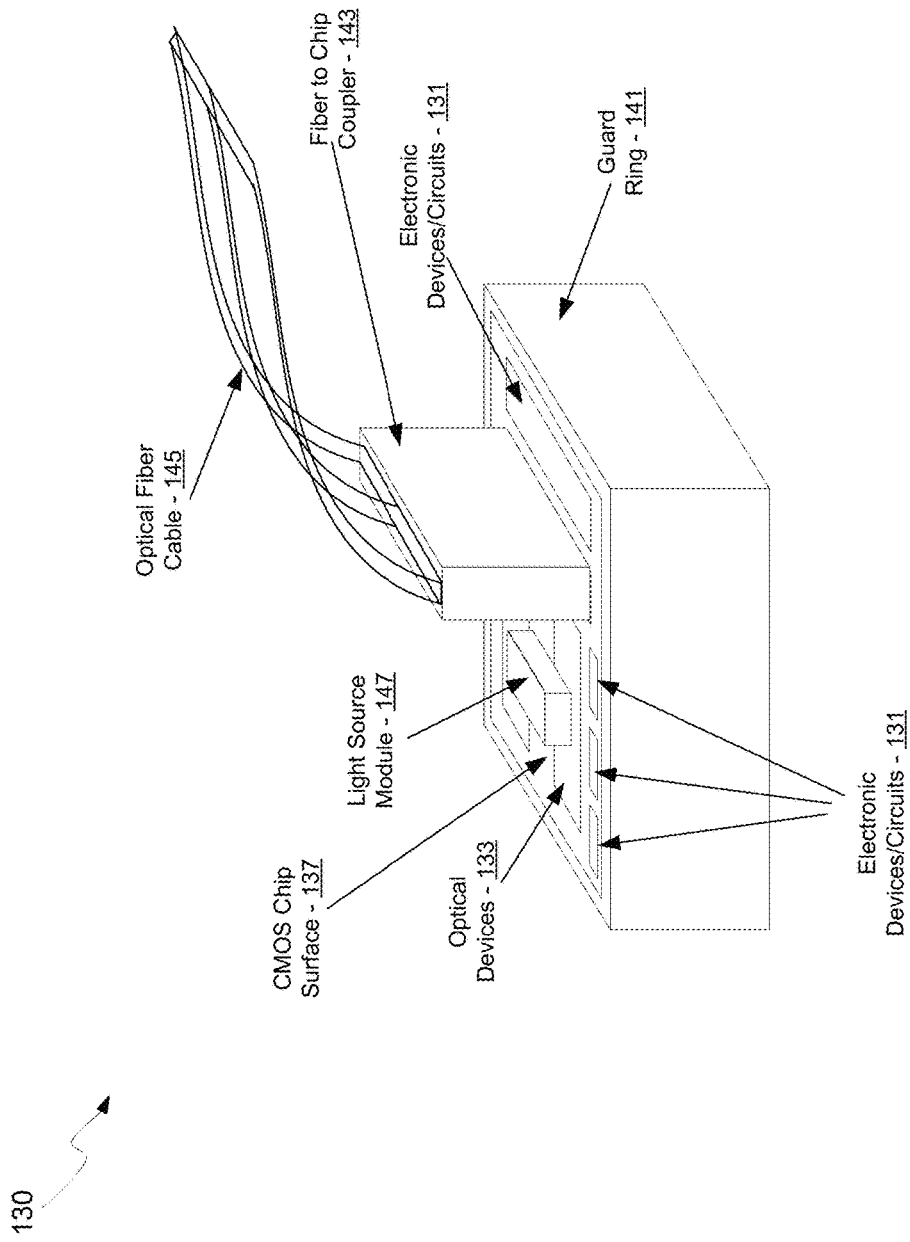
FIG. 1C is a diagram illustrating a CMOS chip coupled to an optical fiber cable, in accordance with an example embodiment of the disclosure.

FIG. 1C is a diagram illustrating a CMOS chip coupled to an optical fiber cable, in accordance with an exemplary embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 143 enables the physical coupling of the optical fiber cable 145 to the CMOS chip 130.

High-speed modulators in SOI CMOS wafers may suffer from parasitic capacitance from the area of the modulator over the conductive substrate. Etch transition features are utilized as boundaries between deep and shallow trenches in the modulator structure, where the deep etch is utilized to isolate the modulator by etching down to the oxide layer in the SOI wafer, and the shallow trench is utilized to form the waveguide structure in the modulator. While the etch transition features are not part of the operational structure of the modulator, they are utilized to form the modulator, and can affect the performance with parasitic capacitance to the substrate. Additionally, the higher doped regions of the PN structure add capacitance to the structure. In an example scenario, the etch transition regions may be reduced or eliminated and/or the higher doped regions that provide contact to the PN diode may be reduced in area with alternating blank regions. This is shown further with respect to FIGS. 2-5.

Power consumption is one of the key performance parameters of an electro-optic phase modulator, and is desired to be as low as possible. In a carrier-depletion-based optical phase modulator, a major source of the power dissipation may be associated with its total input capacitance. The dissipated power may scale linearly with the total capacitance between the cathode and the anode. A large portion of this capacitance may be due to the p-n junction capacitor. Because both the capacitance and the phase shifting efficiency may be driven by the amount of free charges available, there is a trade-off between the junction capacitance and the accumulated phase shift over a certain modulator length. Hence, reducing the junction capacitance comes at the expense of shrinking the total accumulated phase shift, which is not desirable.

Figure 2:
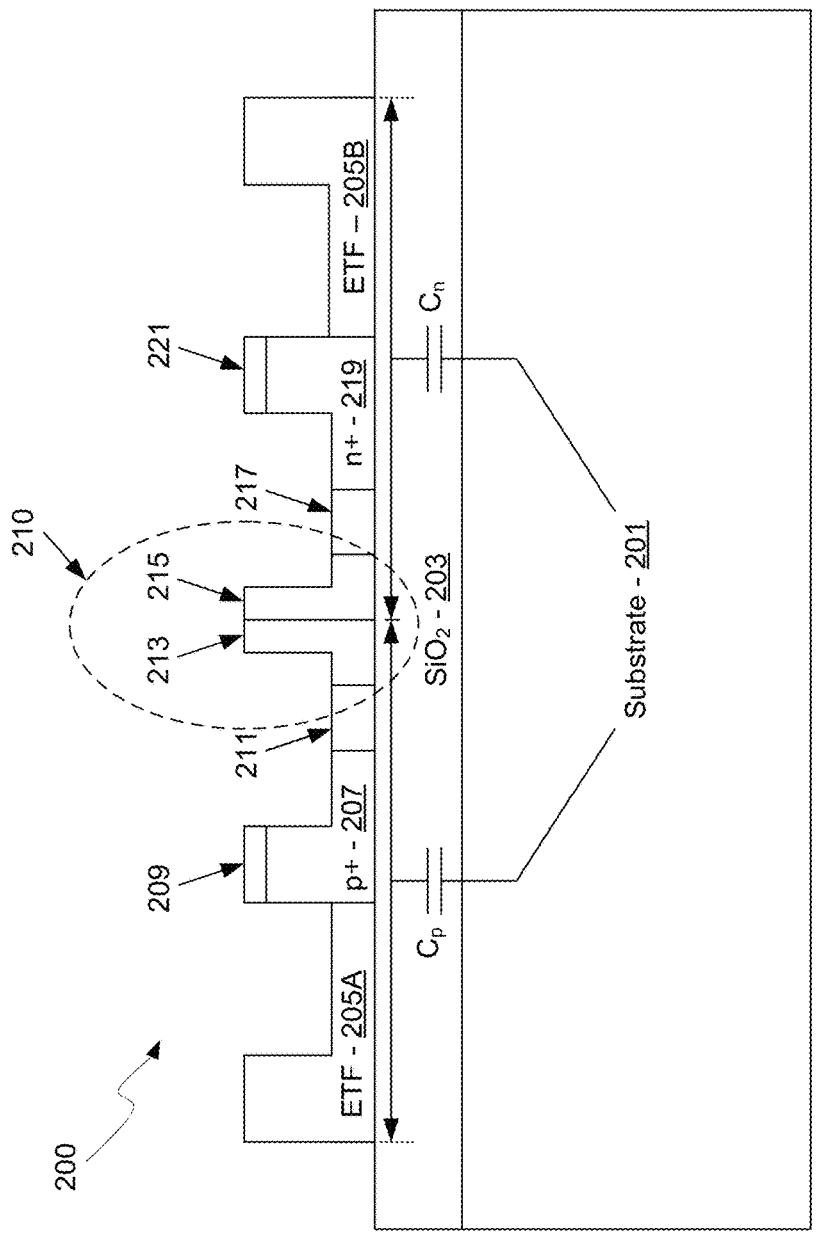
FIG. 2 is a schematic illustrating an optical phase modulator, in accordance with an example embodiment of the disclosure.

FIG. 2 is a schematic illustrating an optical phase modulator, in accordance with an example embodiment of the disclosure. Referring to FIG. 2, there is shown a modulator 200 comprising a substrate 201, an oxide (e.g., $SiO_2$) layer 203, Etch transition features 205A and 205B, a p+ region 207, a p-contact 209, a p region 211, a p– region 213, an n– region 215, an n region 217, an n+ region 219, and an n-contact 221.

The substrate 201 may comprise a silicon-on-insulator (SOI) complementary metal-oxide semiconductor (CMOS) wafer with the oxide layer 203 thick enough for optical confinement. Each of the p- and n-doped layers may be formed in a single silicon layer on top of the oxide layer 203 in an SOI CMOS wafer with the dopants incorporated utilizing implant processes, for example, and subsequently etched to form the vertical features.

The etch transition features 205A and 205B may comprise a deep/shallow trench boundary region, where the deep trench etch removes material down to the oxide layer 203 outside the edges of the etch transition features 205A and 205B, and where the shallow etch forms the waveguide region 210 of the modulator 200 by etching partially through the p+ region 207, p region 211, p– region 213, n– region 215, n region 217, and n+ region 219.

The p+ region 207 may comprise a higher p-doped region for lower resistance and better contact to the PN junction in the waveguide region 210. The p-contact 209 may comprise a p++ doped layer and a metal layer, for example, for providing electrical contact to the p-side on the PN junction in the modulator 200.

The p region 211 may comprise a moderately p-doped layer that may be utilized to configure the depletion region of the PN junction formed by the p– region 213 and the n– region 215, which comprise lightly p- and n-doped layers that form the waveguide region 210.

The n-side of the PN junction is similarly configured, with a moderately doped n region 217, a higher doped n+ region 219, and an n-contact 221, which may comprise a n++ doped layer and a metal layer, for example, for providing electrical contact to the n-side on the PN junction in the modulator 200.

Other than the junction capacitor, there are also contributions from parasitic capacitance in the total input capacitance of the modulator. One source of these parasitics may be an extra capacitor between the two electrodes and through the substrate, which are called "substrate capacitance" in this disclosure, and are identified in FIG. 2 as $C_p$ and $C_n$, and are between either side of the p-n junction and the highly resistive silicon substrate. The parasitic capacitances $C_p$ and $C_n$ may arise from the area of the conductive p and n regions separated from the substrate 201 by the oxide layer 203.

As capacitance is directly proportional to the area of the capacitor, the value may be decreased by reducing the area. Additionally, highly doped regions, such as the p+ region 207 and the n+ region 219, may influence the parasitic capacitance. Similarly, the parasitic capacitance may be reduced by reducing the area of the doped regions without impacting the current injection function of the doped regions. These methods of reducing overall capacitance of the modulator 200 are illustrated in FIGS. 3 and 4.

Figure 3:
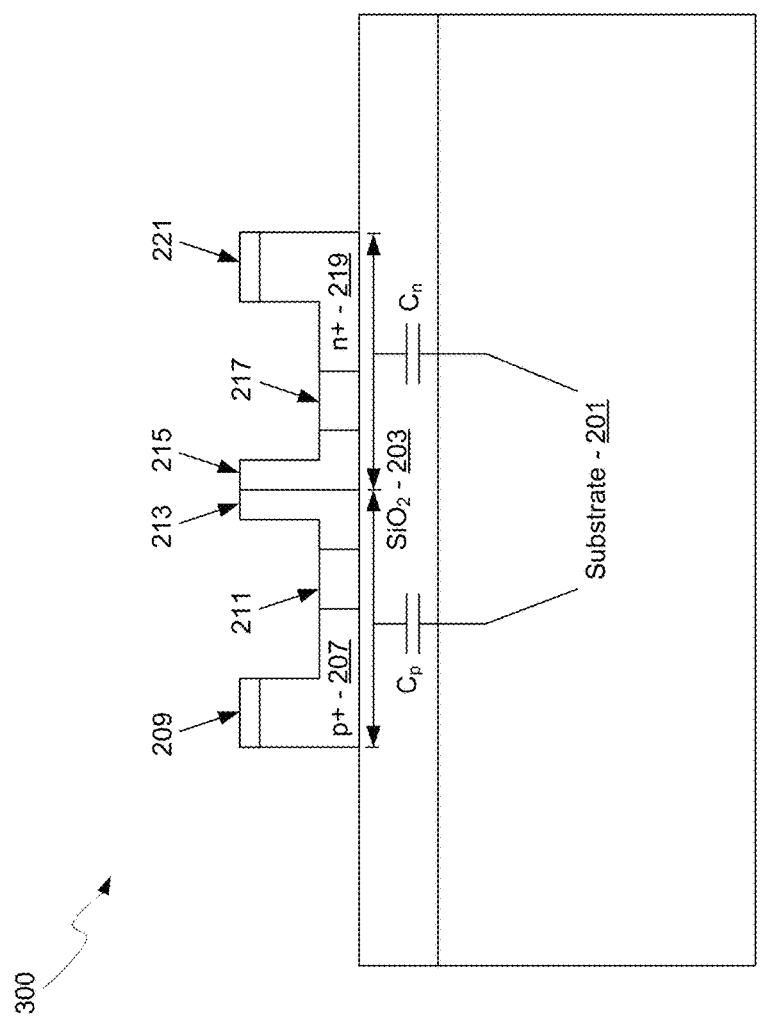
FIG. 3 is a schematic illustrating a reduced area optical phase modulator, in accordance with an example embodiment of the disclosure.

FIG. 3 is a schematic illustrating a reduced area optical phase modulator, in accordance with an example embodiment of the disclosure. Referring to FIG. 3, there is shown modulator 300 with similar features to the modulator 200, including the substrate 201, oxide layer 203, p+ region 207, p-contact 209, p region 211, p– region 213, n– region 215, n region 217, n+ region 219, and n-contact 221, but with the etch transition features 205A and 205B removed.

With the removal of the etch transition features, the area that may contribute to parasitic capacitance to the substrate is reduced, as illustrated by the lateral extent of $C_p$ and $C_n$ in FIG. 3, but without negatively impacting the performance of the modulator 300.

Figure 4:
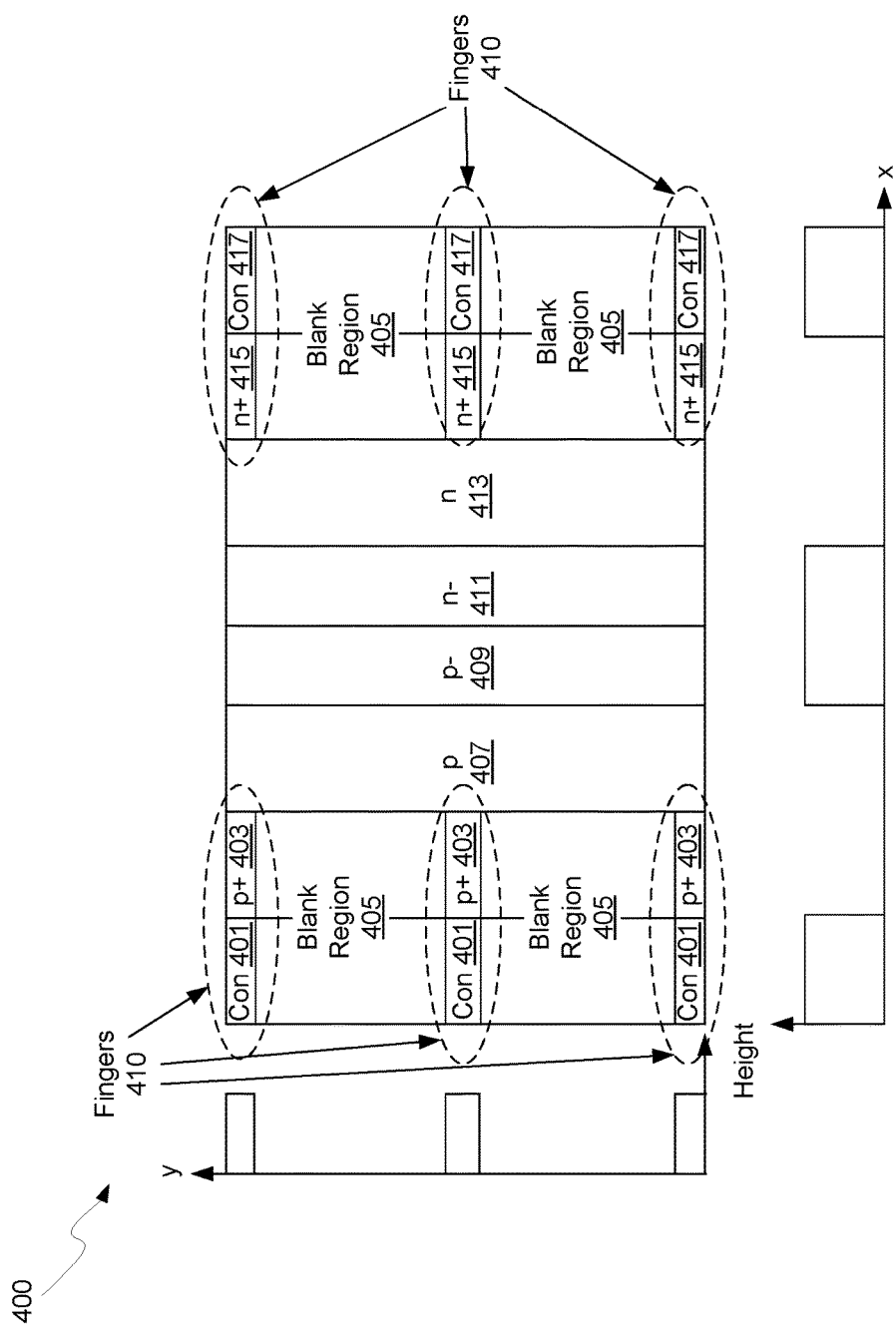
FIG. 4 is a drawing illustrating an optical phase modulator with reduced doped area, in accordance with an example embodiment of the disclosure.

FIG. 4 is a drawing illustrating an optical phase modulator with reduced doped area, in accordance with an example embodiment of the disclosure. Referring to FIG. 4 there is shown a top view of a modulator 400, illustrating the various layers of the modulator structure including an n-contact region 401, a p+ region 403, a p region 407, a p– region 409, an n– region 411, an n region 413, an n+ region 415, and a p-contact region 417. These elements may be similar to the similarly named elements of FIGS. 2 and 3, but with the added feature of the blank regions 405, where the higher doped regions are etched away down to the oxide layer, leaving only the "finger regions" 410 also labeled as p-contact 401, p+ regions 403, n+ regions 415, and n-contacts 417. The height vs x and height vs y plots to the side and bottom of the top view of the modulator 400 illustrate the etched and remaining regions of the structure.

One way to reduce the effect of the highly doped regions in the phase modulator on the substrate capacitance is to selectively etch out silicon along the path of the modulator but only on the highly doped regions on the sides of the junction and leaving the junction itself intact, as illustrated in FIG. 4. In this example scenario, the cross-section of the modulator 400 is intentionally made non-uniform by only leaving "fingers" 410 of fully doped regions accompanied by blank regions 405 where silicon is etched.

As shown in FIG. 4, the finger regions are raised and are considered to be raised fingers. The raised fingers have a major axis perpendicular to the PN junction waveguide and a minor axis parallel to the PN junction waveguide.

The fingers 410 of doped regions then serve to guide the voltage towards the portion of the junction directly adjacent to these blank regions. These fingers 410 of fully doped regions on the two sides of the junction do not need to be aligned with each other and can alternate along the axis of the junction, as illustrated in FIG. 5.

The bandwidth of this type of modulator may largely be determined by the series resistance between the contacts and the junction capacitance. For this type of modulator however, the bandwidth may normally be much higher than the bandwidth of the driving circuitry and the overall bandwidth may thus be determined by the driving circuitry. The amount of reduction in the doped area may then be designed appropriately to keep the modulator's bandwidth higher than that of the driving circuitry, so the overall bandwidth is not affected by this change. Although the modulator bandwidth may be more limited by the driver circuitry bandwidth in some instances, the parasitic capacitance may be important in affecting lower frequency signals, such as in instances where a modulated signal also includes low-frequency information.

FIG. 5 is a drawing illustrating an optical phase modulator with staggered reduced doped area, in accordance with an example embodiment of the disclosure. Referring to FIG. 5, there is shown a top view of a modulator 500, illustrating the various layers of the modulator structure including the n-contact region 401, p+ region 403, p region 407, p– region 409, n– region 411, n region 413, n+ region 415, and n-contact 417. These elements may be similar to the similarly named elements of FIGS. 2-4, but with the added feature of the blank regions 405 in alternating positions on either side of the junction, where the higher doped p-contact 401, p+ regions 403, n+ regions 415, and n-contacts 417 are removed down to the oxide layer leaving the fingers 410.

The height vs x and height vs y plots to the side and bottom of the top view of the modulator 500 illustrate the etched regions of the structure.

The alternating of the blank features 405 helps even further with the capacitance reduction while having very minimal effect on other performance metrics in the phase modulator, such as phase shift and optical loss. This structure also allows the metal lines connected to the p- and n-contacts 401 and 417 to be segmented, further reducing the total capacitance of the device.

Figures 6A, 6B:
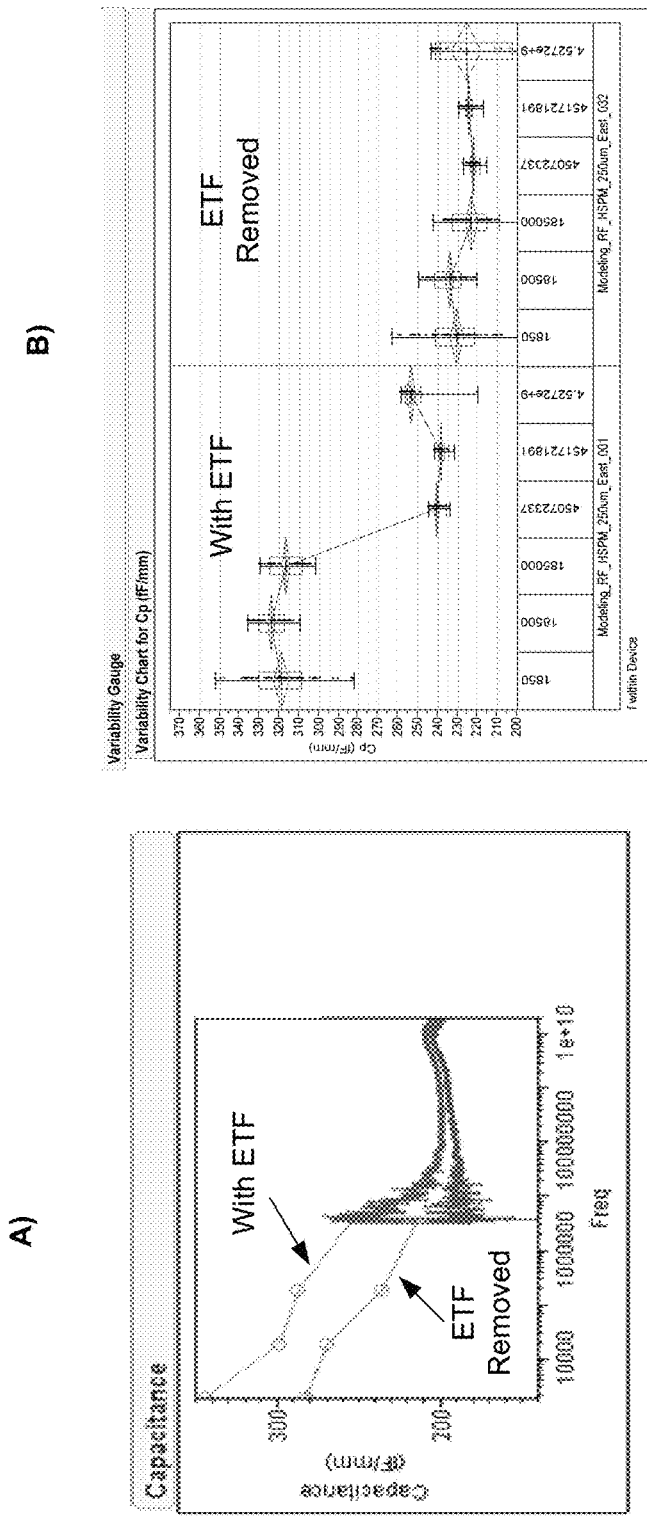
FIGS. 6A and 6B illustrate experimental results for reduced parasitic modulators, in accordance with an example embodiment of the disclosure.

FIGS. 6A and 6B illustrate experimental results for reduced parasitic modulators, in accordance with an example embodiment of the disclosure. Referring to FIG. 6A, there is shown capacitance versus frequency for a modulator with intact etch transition features and a modulator with etch transition features removed. As seen in FIG. 6A, more than 100 fF/mm extra capacitance at lower frequencies may be attributed to parasitics. At higher frequencies, higher than 20 MHz, for example, some parasitics are frozen out, but can still cause an increase in deterministic jitter.

FIG. 6B illustrates capacitance results for modulators across a wafer, with the left graph showing results for modulators with intact etch transition regions and the right plot showing modulators with the features removed. The plots again illustrate that the removing the etch transition features greatly reduces the capacitance at low frequencies and that the extra capacitance freezes out at higher frequencies (>20 MHz).

In an example embodiment, a method and system are disclosed for a low-parasitic silicon high-speed phase modulator. In this regard, aspects of the invention may comprise fabricating an optical phase modulator that comprises a PN junction waveguide formed in a silicon layer, wherein the silicon layer may be on an oxide layer and the oxide layer may be on a silicon substrate. The PN junction waveguide may have p-doped and n-doped regions on opposite sides along a length of the PN junction waveguide, and portions of the p-doped and n-doped regions may be removed. Contacts may be formed on remaining portions of the p-doped and n-doped regions.

Portions of the p-doped and n-doped regions may be removed symmetrically about the PN junction waveguide. Portions of the p-doped and n-doped regions may be removed in a staggered fashion along the length of the PN junction waveguide. Etch transition features may be removed along the p-doped and n-doped regions, wherein the etch transition features provide a transition between deep etched and shallow etched features in the optical phase modulator. The silicon layer, oxide layer, and silicon substrate may comprise a silicon-on-insulator (SOI) complementary metal-oxide semiconductor (CMOS) wafer.

A parasitic capacitance of the optical phase modulator may be reduced by the removing of portions of the p-doped and n-doped regions. The optical phase modulator may be integrated in an optical transceiver formed on the silicon substrate. The remaining portions of the p-doped and n-doped regions may comprise fingers for forming contacts that are staggered on opposite sides along the length of the PN junction waveguide. Portions of the p-doped and n-doped regions may be removed down to the oxide layer on the silicon substrate. The optical phase modulator may be integrated in a Mach-Zehnder interferometer modulator.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for a semiconductor device, the method comprising:
   fabricating an optical phase modulator that comprises a PN junction waveguide formed in a silicon layer, wherein the silicon layer is on an oxide layer and the oxide layer is on a silicon substrate, said PN junction waveguide having p-doped and n-doped regions on opposite sides along a length of the PN junction waveguide with only p-doping on a first of said opposite sides and only n-doping on a second of said opposite sides;
   removing first portions of the p-doped and n-doped regions thereby forming the PN junction waveguide;
   removing second portions of the p-doped and n-doped regions intermittently along a length of the PN junction waveguide such that raised fingers of p-doped and n-doped regions are formed along said PN junction waveguide, wherein a major axis of said raised fingers is perpendicular to said PN junction waveguide and a minor axis of said raised fingers is parallel to said PN junction waveguide; and
   forming contacts to said fingers of p-doped and n-doped regions.

2. The method according to claim 1, comprising removing the second portions of the p-doped and n-doped regions symmetrically about the PN junction waveguide.

3. The method according to claim 1, comprising removing the second portions of the p-doped and n-doped regions in a staggered fashion along the length of the PN junction waveguide.

4. The method according to claim 1, comprising removing etch transition features along the p-doped and n-doped regions, wherein the etch transition features provide a transition between deep etched and shallow etched features in the optical phase modulator.

5. The method according to claim 1, wherein the silicon layer, oxide layer, and silicon substrate comprise a silicon-on-insulator (SOI) complementary metal-oxide semiconductor (CMOS) wafer.

6. The method according to claim 1, comprising reducing a parasitic capacitance of the optical phase modulator by the removing of the second portions of the p-doped and n-doped regions.

7. The method according to claim 1, wherein the optical phase modulator is integrated in an optical transceiver formed on the silicon substrate.

8. The method according to claim 1, wherein the remaining portions of the p-doped and n-doped regions comprise fingers for forming contacts that are staggered on opposite sides along the length of the PN junction waveguide.

9. The method according to claim 1, comprising removing the second portions of the p-doped and n-doped regions down to the oxide layer on the silicon substrate.

10. The method according to claim 1, wherein the optical phase modulator is integrated in a Mach-Zehnder interferometer modulator.

11. A system for communication, the system comprising:
an optical phase modulator that comprises a PN junction waveguide formed in a silicon layer, wherein the silicon layer is on an oxide layer and the oxide layer is on a silicon substrate;
first p-doped and n-doped regions on opposite sides along a length forming the PN junction waveguide with only p-doping on a first of said opposite sides and only n-doping on a second of said opposite sides;
regions where the p-doped and n-doped regions have been intermittently removed along the length of the PN junction waveguide such that raised fingers of p-doped and n-doped regions are formed along said PN junction waveguide, wherein a major axis of said raised fingers is perpendicular to said PN junction waveguide and a minor axis of said raised fingers is parallel to said PN junction waveguide; and
contacts formed on said fingers of p-doped and n-doped regions.

12. The system according to claim 11, wherein portions of the p-doped and n-doped regions are removed symmetrically about the PN junction waveguide.

13. The system according to claim 11, wherein portions of the p-doped and n-doped regions are removed in a staggered fashion along the length of the PN junction waveguide.

14. The system according to claim 11, wherein etch transition features are removed along the p-doped and n-doped regions, wherein the etch transition features provide a transition between deep etched and shallow etched features in the optical phase modulator.

15. The system according to claim 14, wherein the remaining portions of the p-doped and n-doped regions comprise fingers where contacts are formed that are staggered on opposite sides along the length of the PN junction waveguide.

16. The system according to claim 11, wherein the silicon layer, oxide layer, and silicon substrate comprise a silicon-on-insulator (SOI) complementary metal-oxide semiconductor (CMOS) wafer.

17. The system according to claim 11, wherein the optical phase modulator is integrated in an optical transceiver formed on the silicon substrate.

18. The system according to claim 11, wherein portions of the p-doped and n-doped regions are removed down to the oxide layer on the silicon substrate.

19. The system according to claim 11, wherein the optical phase modulator is integrated in a Mach-Zehnder interferometer modulator.

20. A system for communication, the system comprising:
a Mach-Zehnder optical modulator that comprises a PN junction waveguide formed in a silicon layer on an oxide layer, wherein the silicon layer and the oxide layer are part of a silicon-on-insulator (SOI) complementary metal-oxide semiconductor (CMOS) substrate;
p-doped and n-doped regions on opposite sides along a length of the PN junction waveguide with only p-doping on a first of said opposite sides and only n-doping on a second of said opposite sides;
regions where the p-doped and n-doped regions have been removed in an alternating fashion along the length of the PN junction waveguide such that raised fingers of p-doped and n-doped regions are formed along said PN junction waveguide, wherein a major axis of said raised fingers is perpendicular to said PN junction waveguide and a minor axis of said raised fingers is parallel to said PN junction waveguide; and
contacts formed on said fingers of p-doped and n-doped regions.

* * * * *